US008248250B2

(12) United States Patent
Chen et al.

(10) Patent No.: US 8,248,250 B2

(45) Date of Patent: Aug. 21, 2012

(54) PERSONAL WATER SAFETY DEVICE AND METHOD THEREOF

(75) Inventors: Chien-Lin Chen, Taipei Hsien (TW); Pi-Jye Tsaur, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 336 days.

(21) Appl. No.: 12/649,295

(22) Filed: Dec. 29, 2009

(65) Prior Publication Data

US 2011/0074586 A1 Mar. 31, 2011

(30) Foreign Application Priority Data

Sep. 29, 2009 (CN) .......................... 2009 1 0307988

(51) Int. Cl.
*G08B 23/00* (2006.01)
*G08B 21/00* (2006.01)
*G01S 3/80* (2006.01)

(52) U.S. Cl. ..................... 340/573.6; 340/529; 340/604; 367/124

(58) Field of Classification Search ................ 340/573.6
See application file for complete search history.

(56) References Cited

U.S. PATENT DOCUMENTS 4,776,045 A * 10/1988 Mysliwiec et al. ............... 2/426
4,961,339 A * 10/1990 Kleis et al. ......................... 73/73
5,408,222 A * 4/1995 Yaffe et al. ..................... 340/604
6,154,140 A * 11/2000 Thorpe et al. .............. 340/573.6
6,327,220 B1 * 12/2001 Miller et al. .................. 367/134
RE38,475 E * 3/2004 Marshall .......................... 441/89
7,068,175 B1 * 6/2006 Pennington ................... 340/623
2008/0218332 A1 * 9/2008 Lyons ........................... 340/529
2008/0266118 A1 * 10/2008 Pierson et al. ............. 340/573.6
2008/0278338 A1 * 11/2008 Krell .......................... 340/573.6
2009/0027211 A1 * 1/2009 Cutler et al. ............... 340/573.6
2009/0219785 A1 * 9/2009 Van "T Klooster et al. .. 367/124
2009/0295566 A1 * 12/2009 Weintraub ............... 340/539.11

* cited by examiner

*Primary Examiner* — Daniel Wu
*Assistant Examiner* — Emily C Terrell
(74) *Attorney, Agent, or Firm* — Altis Law Group, Inc.

(57) ABSTRACT

A personal water safety device includes at least three base stations, at least one water sensing device, and an alarm apparatus. The at least one water sensing device wirelessly communicates with each of the at least three base stations. The alarm apparatus wirelessly communicates with each of the at least three base stations. Each water sensing device is worn by a swimmer and is triggered to measure elapsed time when the swimmer submerges in water, and transmits the measured time to the at least three base stations. The alarm apparatus receives the measured time transmitted from each of the at least three base stations, and generates an alarm when the measured time of one of the at least water sensing device exceeds a predetermined time limit.

13 Claims, 7 Drawing Sheets

PERSONAL WATER SAFETY DEVICE AND METHOD THEREOF

BACKGROUND

1. Technical Field

Embodiments of the present disclosure generally relate to safety devices and methods, and more particularly to a personal water safety device and a method thereof.

2. Description of Related Art

Currently, if a swimmer is submerged for too long, there is no way for people nearby to know this unless they are watching the swimmer at relevant time.

Therefore, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the data "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
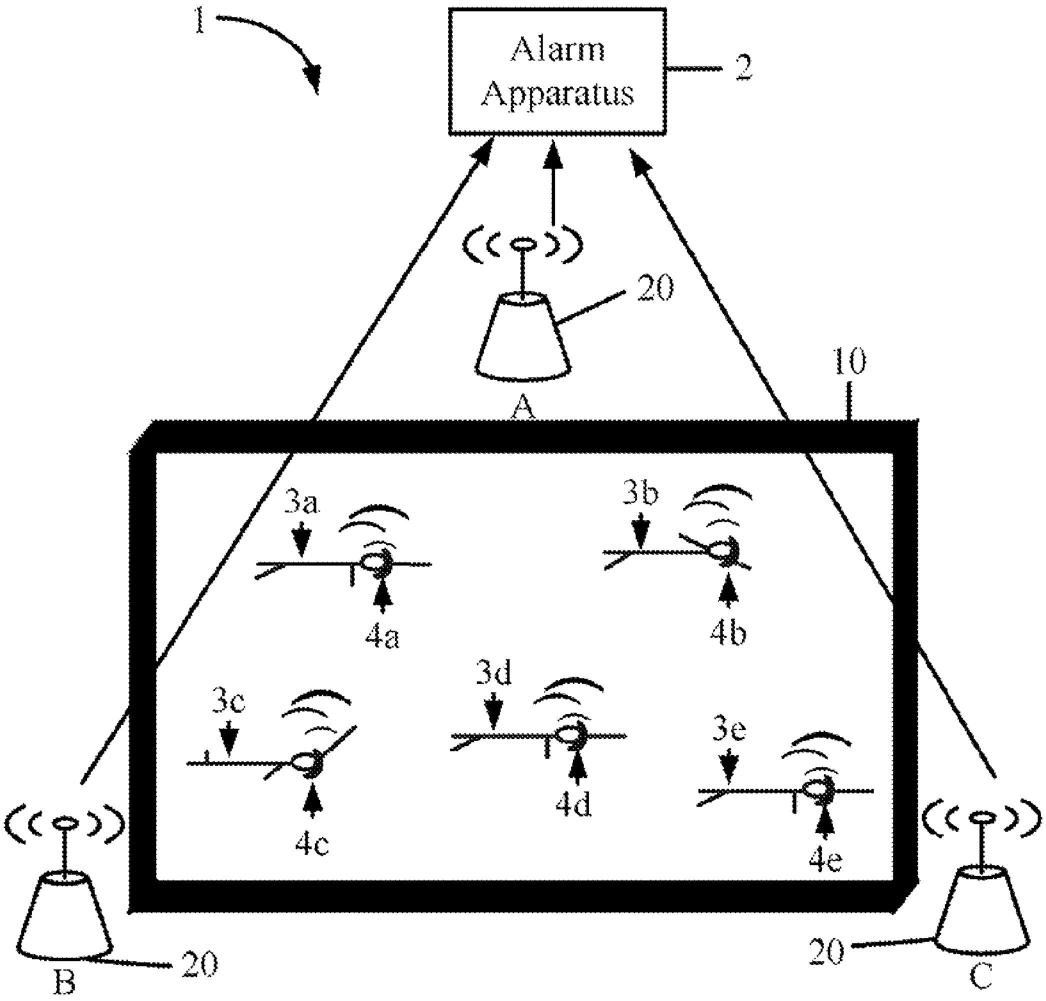
FIG. 1 is a schematic diagram of one embodiment of a personal water safety device.

FIG. 1 is a schematic diagram of one embodiment of a personal water safety device 1 (hereinafter referred to as "safety device 1"). The safety device 1 includes an alarm apparatus 2, at least three base stations 20 labeled "A," "B," and "C," and at least one water sensing device 4, for example, five water sensing devices 4 are shown in FIG. 1, and labeled "4_a_," "4_b_," "4_c_," "4_d_," and "4_e_". Each sensing device 4 is worn by one of five swimmers "3_a_," "3_b_," "3_c_," "3_d_," or "3_e_" in FIG. 1. In the embodiment, the base stations 20 are arranged around a body of water 10 (such as a swimming pool, for example) in a triangle. Each sensing device 4 can wirelessly communicate with the base stations 20, and each of the base stations 20 can also wirelessly communicate with the alarm apparatus 2. In the embodiment, the alarm apparatus 2 can be a personal computer, a notebook, a personal digital assistant, or a mobile telephone, for example.

In order to distinctly describe the safety device 1, the present embodiment gives an example of the swimmer 3_a_ wearing the water sensing device 4 in the water 10, and three base stations 20 are arranged around the water 10 in a triangle.

Should the water sensing device 4_a_ becomes submerged it is activated to measure an elapsed time when an electrical conductivity of the water sensing device 4_a_ is in a predetermined range, and wirelessly transmits the measured time as a time signal to the three base stations 20. Each of the three base stations 20 receives the measured time of the water sensing device 4 in different signal intensities based on a transmitting direction of the time signal. For example, the signal intensity of the time signal of the water sensing device "4_a_" received by the base station "A" is greater than the signal intensity of this received by the base station "B" or "C."

The three base stations 20 wirelessly transmit the time signal to the alarm apparatus 2. The alarm apparatus 2 receives the time signal transmitted from each of the three base stations 20, and generates an alarm if the measured time of the water sensing device 4 exceeds a predetermined time limit. Detail functions of the alarm apparatus 2 will be described in FIG. 5 and FIG. 6.

Figure 2:
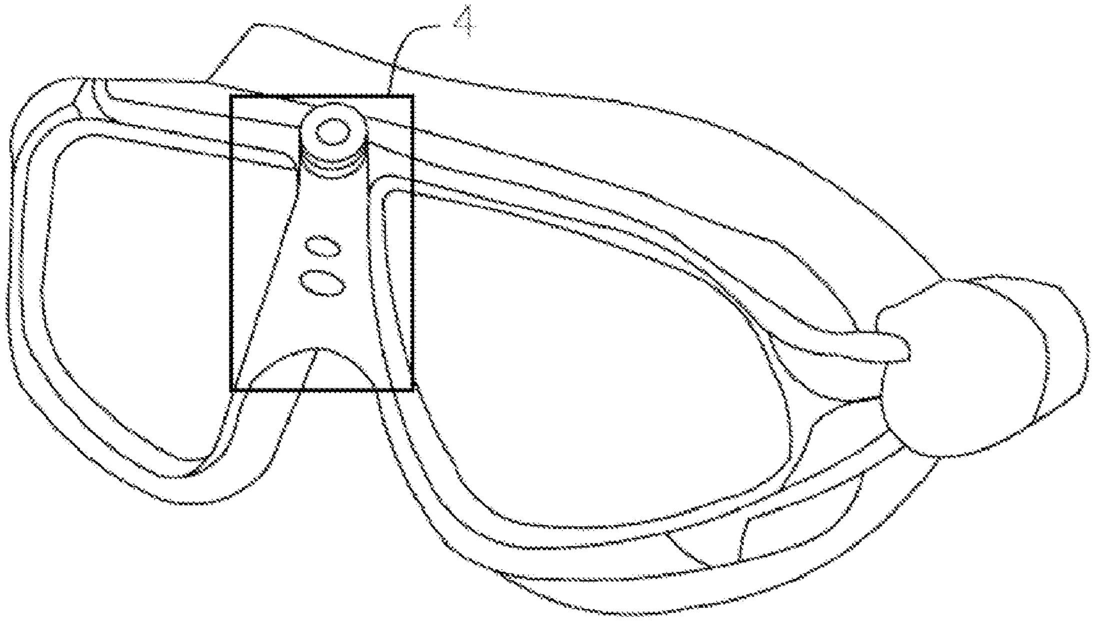
FIG. 2 is a schematic diagram of a pair of swimming goggles with a water sensing device of the personal water safety device of FIG. 1.

FIG. 2 is a schematic diagram of a pair of swimming goggles with the water sensing device 4 installed therein. In the embodiment, the water sensing device 4 is between two portions of the goggle frame. The water sensing device 4 acts as a signal emitter should a swimmer wearing it have trouble in the water. The water sensing device 4 is installed in the goggles as an example for the embodiment and may be installed elsewhere about the swimmer in other embodiments, such as in other articles of swimwear or swim equipment.

Figure 3:
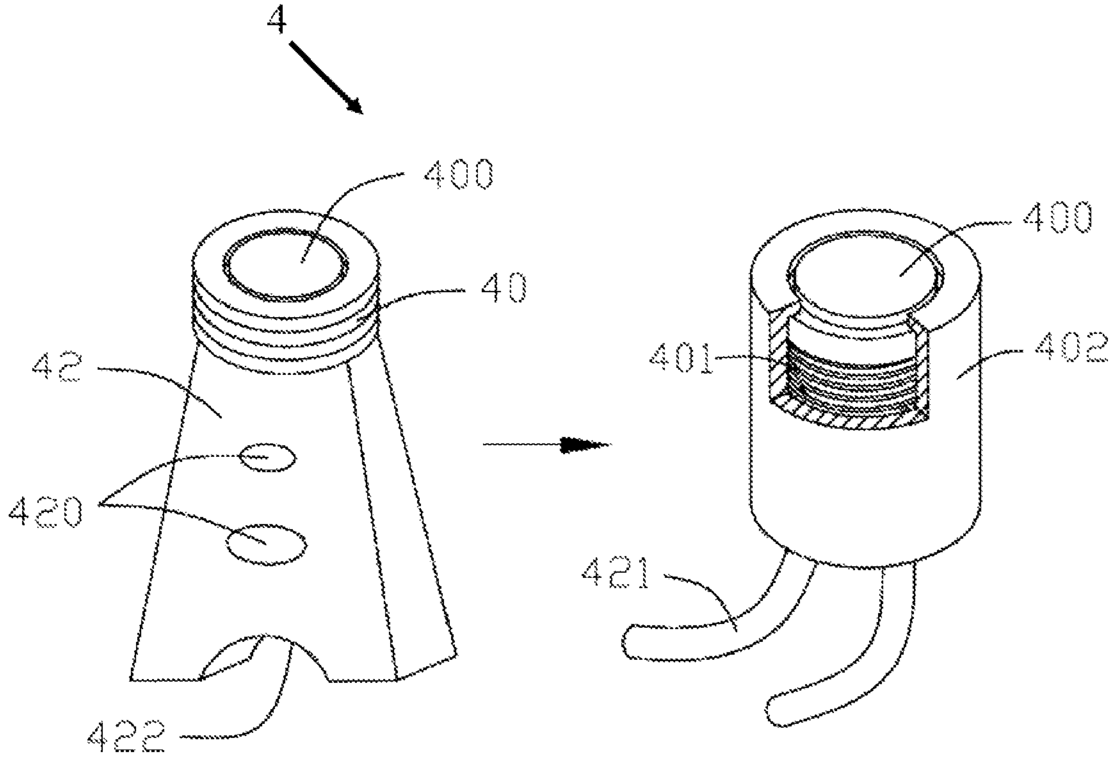
FIG. 3 illustrates an isometric view of an exemplary embodiment of the water sensing device and an exemplary water chamber of the water sensing device.

FIG. 3 illustrates an isometric view of an exemplary embodiment of the water sensing device 4, and an exemplary water chamber of the water sensing device 4. As shown in FIG. 3, the water sensing device 4 typically includes a barrel portion 40, and a base part 42 connected to the barrel portion 40. In the embodiment, the barrel portion 40 may be a cylinder. The barrel portion 40 includes a button 400, and a cylinder 402 connected to the button 400 via a spring 401. The button 400 protrudes out a head portion of the barrel portion 40, and the button 400 is narrower than the barrel portion 40. The base part 42 has a cutout in a bottom surface 422 thereof to accommodate a bridge of the nose of the swimmer 3_a_. In the embodiment, an upper end of the base part 42 is narrower than a bottom end of the base part 42. The base part 42 further includes one or more holes 420 (two holes are shown) that are connected to the cylinder 402 via one or more pipes 421. If the water sensing device 4 is out of the water, any water in the cylinder 402 drains out through the one or more holes 420.

Figure 4:
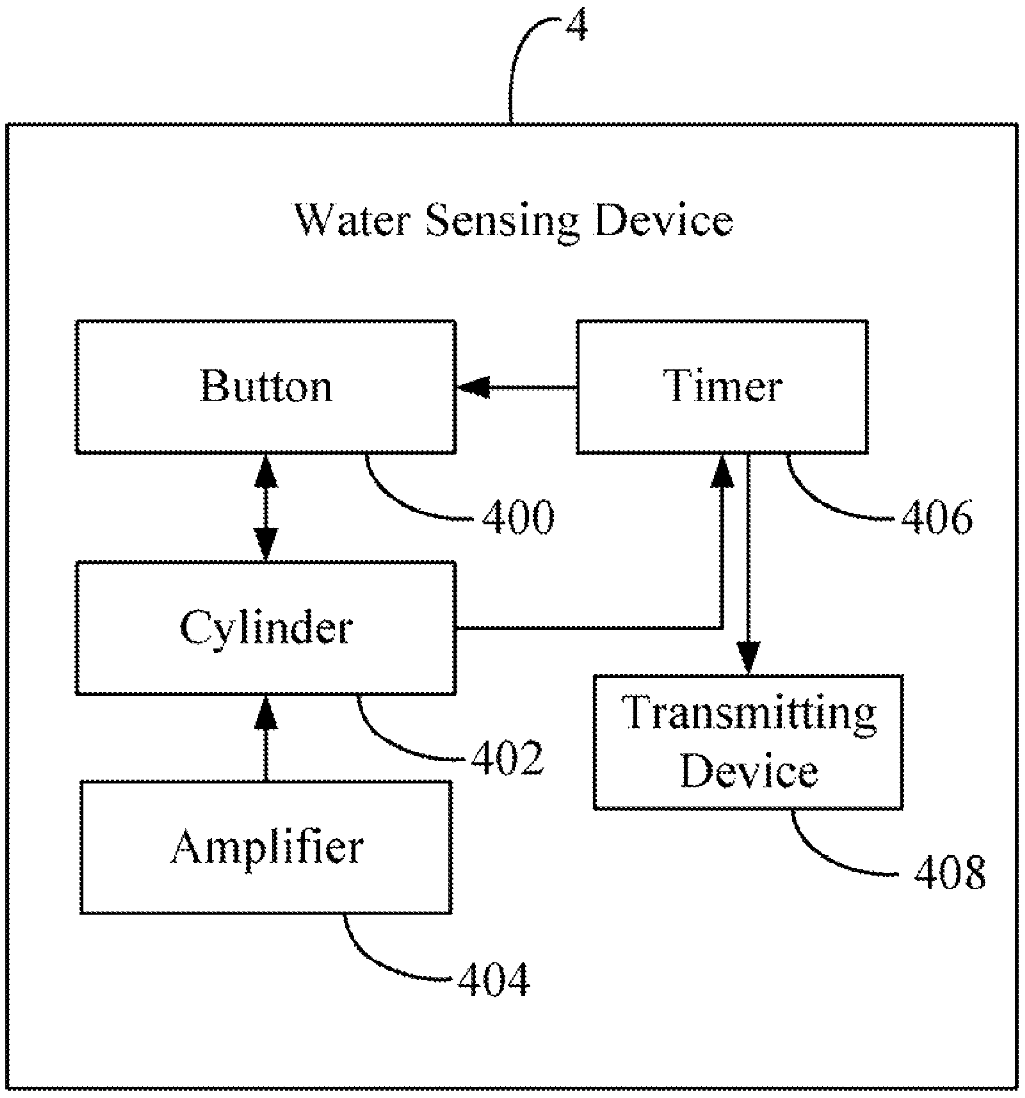
FIG. 4 is a block diagram of an exemplary structure of the water sensing device of FIG. 2.

FIG. 4 is a block diagram of an exemplary structure of the water sensing device 4. In one embodiment, the water sensing device 4 may further include an amplifier 404, a timer 406, and a transmitting device 408, which are installed in the base part 42. The amplifier 404 is connected to the timer 406. The timer 406 is connected to the cylinder 402 and the button 400. The transmitting device 408 is electrically connected to the timer 406.

In the embodiment, the cylinder 402 may be a conduction cylinder. The cylinder 402 detects the electrical conductivity of the cylinder 402, and determines when water has filled the barrel portion 40, thus recognizing whether the water sensing device 4 (namely the swimmer 3_a_) is under water. To accurately measure what may be a relatively small difference in the electrical conductivity of the cylinder 402 be it with air or water, the amplifier 404 is capable of amplifying the measured electrical conductivity. When the electrical conductivity is within the predetermined range, the timer 406 is activated. If water pressure activates the button 400 or if it is manually pressed by a swimmer, water can enter the cylinder 402 under ambient pressure through a gap between the button 400 and the barrel portion 40 when the button 400 is depressed. The timer 406 measures elapsed time when the electrical conductivity of the interior of the cylinder 402 is in the predetermined range. Timing stops if the electrical conductivity moves back out of the predetermined range, for example, the timing stops when the water sensing device 4 is out of water. The transmitting device 408 transmits the measured time as a time signal to the three base station 20.

Figure 5:
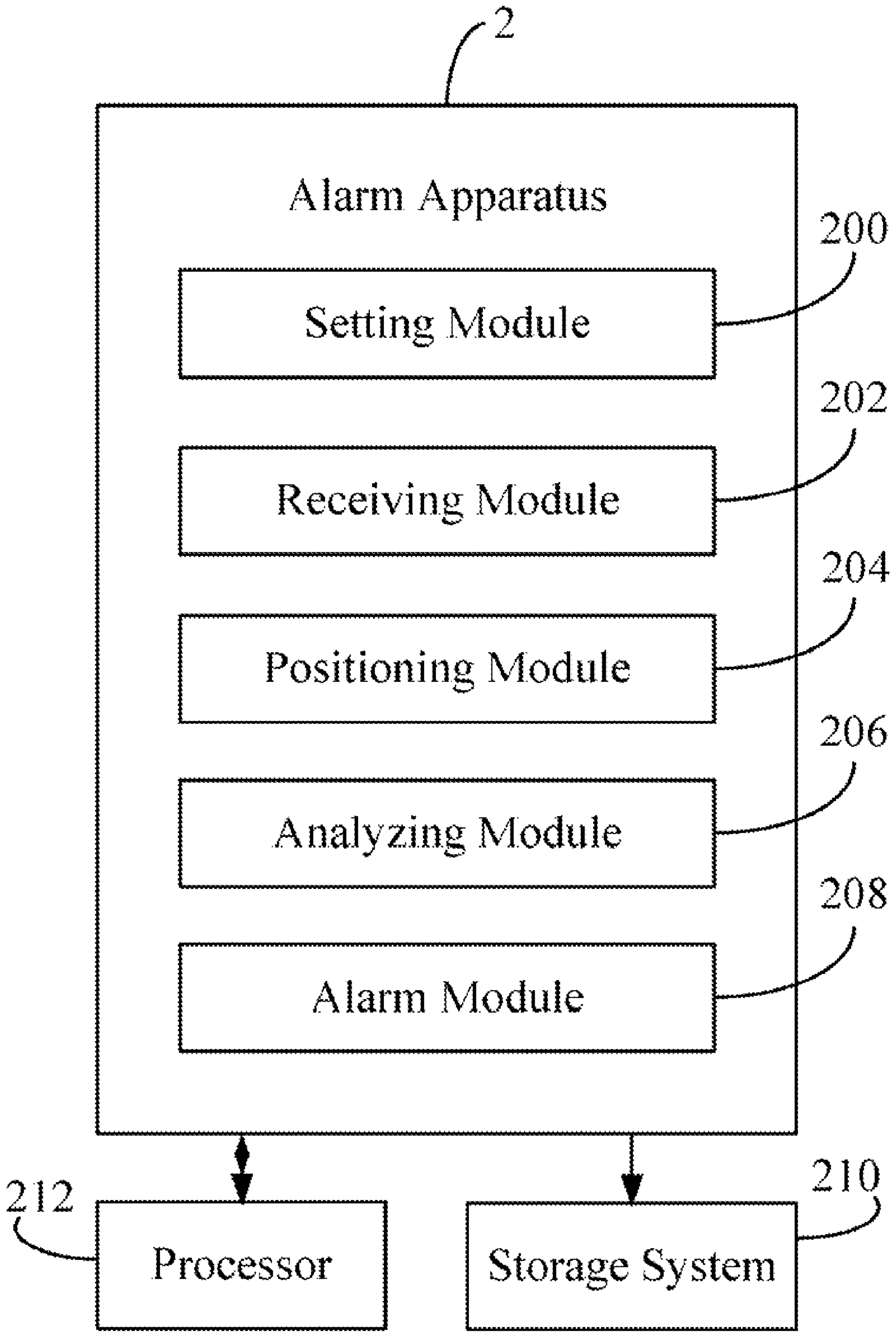
FIG. 5 is a block diagram of one embodiment of function modules of an alarm apparatus of the personal water safety device of FIG. 1.

FIG. 5 is a block diagram of one embodiment of function modules of the alarm apparatus 2. The alarm apparatus 2 may include a plurality of instructions stored in a storage system 210, and executed by at least one processor 212. In one embodiment, the alarm apparatus 2 may include a setting module 200, a receiving module 202, a positioning module 204, an analyzing module 206, and an alarm module 208.

Figure 6:
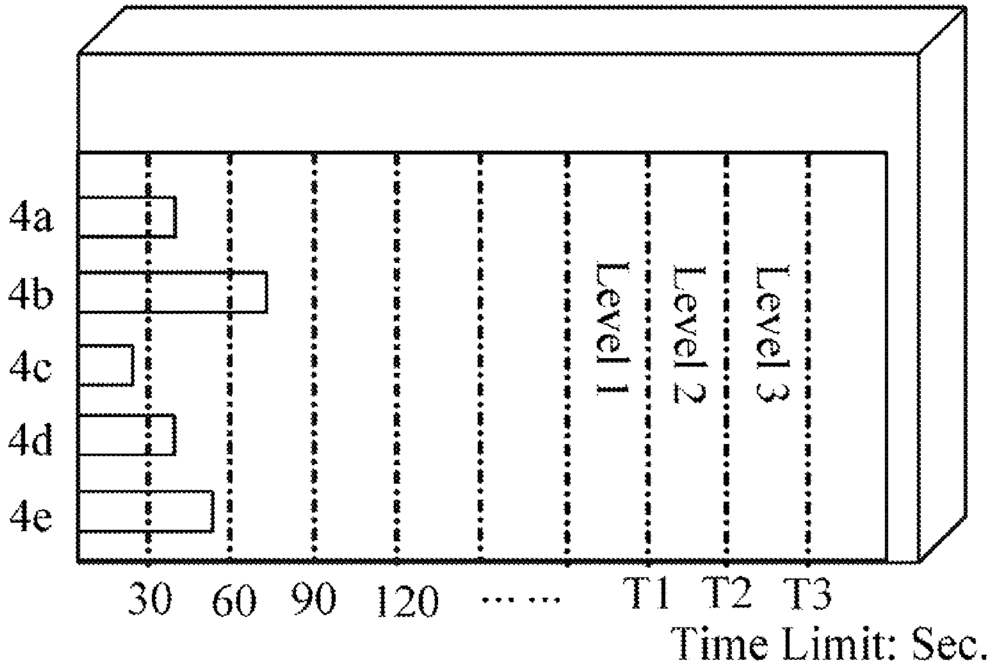
FIG. 6 is a schematic diagram of a plurality of threat levels set in the alarm apparatus of FIG. 5.

The setting module 200 is operable to set a plurality of threat levels labeled as "level 1," "level 2," and "level 3," and each of the plurality of threat levels corresponds a time limit. As shown in FIG. 6, the time limit of the "level 1" is a time "T1," the time limit of the "level 2" is a time "T2," and the time limit of the "level 3" is a time "T3." The setting module 200 is further operable to set a predetermined threat level for the swimmer 3*a* installed with the water sensing device 4. In the embodiment, each predetermined threat level corresponds to a predetermined time limit. In another embodiment, the setting module is further operable to set a serial number for each of the at least water sensing device 4.

The receiving module 202 is operable to receive the measured time transmitted from each of the three base stations 20.

The analyzing module 204 is operable to determine a threat level for the swimmer 3*a* by comparing the measured time with the time limit of each of the threat levels, and determine whether the determined threat level of the swimmer 3*a* exceeds a corresponding predetermined threat level.

If the determined threat level of one swimmer 3*a* exceeds the corresponding predetermined threat level, namely the measured time exceeds the predetermined time limit, the alarm module 208 generates an alarm to alert anyone in the vicinity of the alarm apparatus 2 or anyone holding the alarm apparatus 2.

Figure 7:
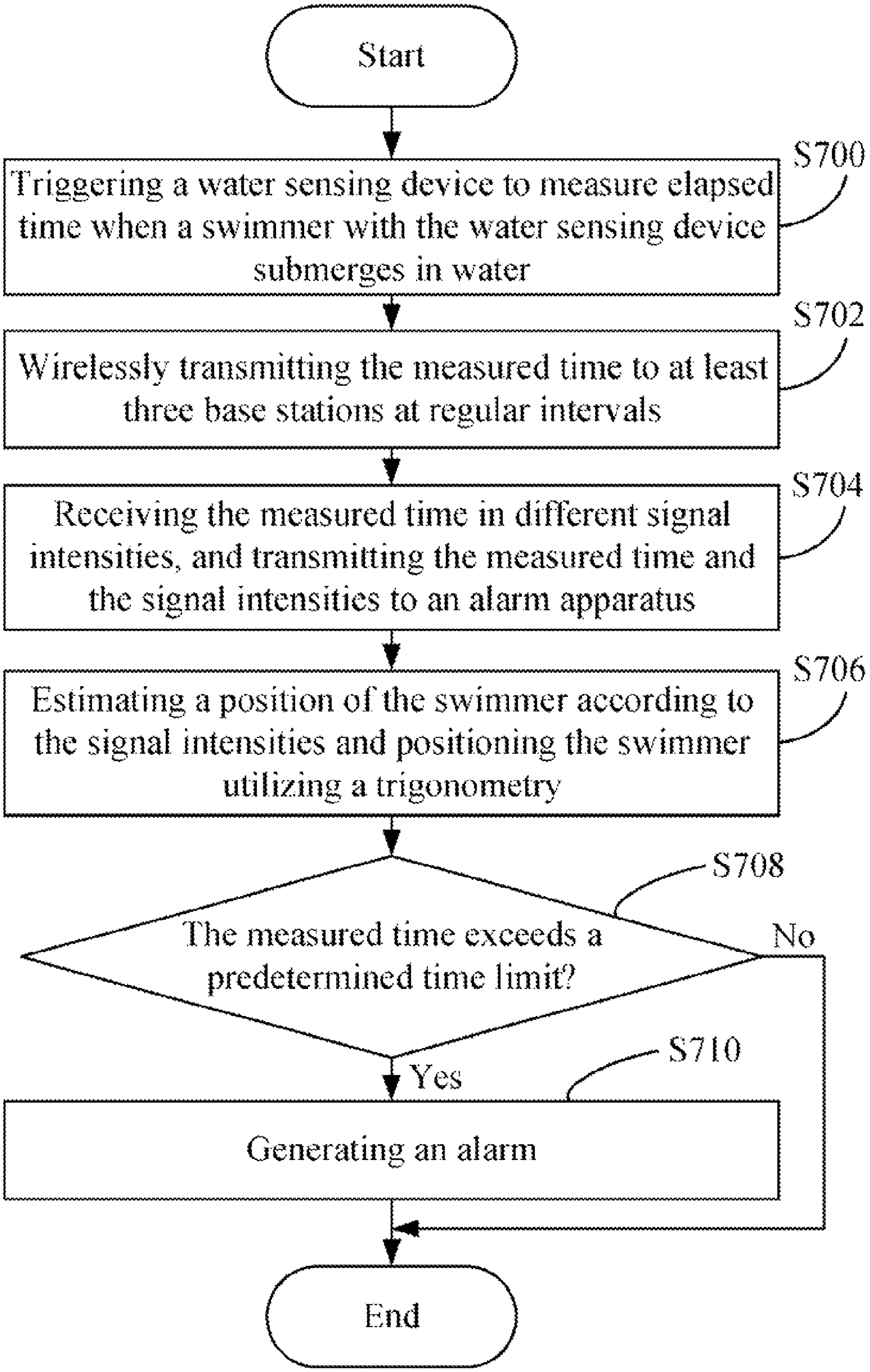
FIG. 7 is a flowchart illustrating one embodiment of a method for monitoring a swimmer.

FIG. 7 is a flowchart illustrating one embodiment of method for monitoring the swimmer 3*a*.

Once the swimmer 3*a* submerges in water, in block 5700, the water sensing device 4 worn by the swimmer 3*a* is triggered, and the timer 406 measures elapsed time when electrical conductivity of the water sensing device 4 is in a predetermined range.

In block S702, the transmitting device 408 wirelessly transmits the measured time as a time signal to the three base stations 20 at a regular interval. In the embodiment, the regular interval is predetermined by the swimmer 3*a*, such as three seconds or five seconds, for example.

In block S704, each of the three base stations 20 receives the measured time in different signal intensities based on a transmitting direction of the time signal, and transmits the measured time and the signal intensities to the alarm apparatus 2.

In block S706, the receiving module 202 receives the measured time and the signal intensities, the positioning module 204 estimates a position of the swimmer 3*a* according to the signal intensities, and positions the swimmer 3*a* utilizing a trigonometry in convenient for a supposed rescue. For example, the three base stations 20 are arranged around the body of the water 10 in a triangle, a distance between each two base stations 20 (hereinafter referred as "edge lengths") can be known, the swimmer 3*a* is considered as a point in the triangle. By using the edge lengths, the swimmer 3*a* can be positioned.

In block S708, the analyzing module 206 compares the measured time with the time limit of each of the threat levels as mentioned in FIG. 6, to determine whether the measured time exceeds the predetermined time limit. That is, through the comparison, the analyzing module 206 can determine a threat level for the swimmer 3*a*, and determine whether the determined threat level of the swimmer 3*a* exceeds a corresponding predetermined threat level, such as the level "1," for example. If the determined threat level of the swimmer 3*a* exceeds the corresponding predetermined threat level, the flow enters block 5710. Otherwise, if the determined threat level of the swimmer 3*a* does not exceed the corresponding predetermined threat level, the flow ended.

In block 5710, the alarm module 208 generates an alarm to alert anyone in the vicinity of the alarm apparatus 2 or anyone holding the alarm apparatus 2.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A personal water safety device, comprising:

at least three base stations arranged around a body of water in a triangle;

at least one water sensing device, each of the at least one water sensing device being worn by a swimmer and wirelessly communicating with each of the at least three base stations, and each of the at least one water sensing device operable to measure elapsed time when the water sensing device is triggered after the swimmer submerges in the water, and transmit the measured time to each of the at least three base stations at a regular interval, and each of the three base stations receiving the measured time of the at least one water sensing device in different signal intensities based on a transmitting direction of time signal of the measured time;

wherein the water sensing device is triggered to measure the elapsed time when an electrical conductivity of the water sensing device is in a predetermined range, and stops timing when the electrical conductivity is out of the predetermined range;

an alarm apparatus wirelessly communicating with each of the at least three base stations, and operable to receive the measured time transmitted from each of the at least three base stations, and generate an alarm upon a condition that the measured time of one of the at least water sensing device exceeds a predetermined time limit; and the alarm apparatus comprising a positioning module that estimates a position of each of the water sensing device according to the signal intensities of the measured time of each of the at least one water sensing device, and positions each of the water sensing device utilizing trigonometry.

2. The safety device as claimed in claim 1, wherein each of the at least water sensing device comprises:
   a barrel portion, comprising:
      a button installed in the barrel portion, and protruding out a head portion of the barrel portion; and
      a cylinder connected to the button, the cylinder being entered water when the button is pressed; and
   a base part connected to the barrel portion, the base part comprising:
      a timer connected to the cylinder, and measuring elapsed time when electrical conductivity of the cylinder is in the predetermined range; and
      a transmitting device operable to wirelessly transmit the measured time to the at least three base stations.

3. The safety device as claimed in claim 2, wherein the cylinder is a conduction cylinder that recognizes whether the safety device is under water by detecting the electrical conductivity of the cylinder.

4. The safety device as claimed in claim 2, further comprising an amplifier that amplifies the measured electrical conductivity of the cylinder.

5. The safety device as claimed in claim 2, wherein the button is narrower than the barrel portion, water entered the cylinder through a gap between the button and the barrel portion.

6. The safety device as claimed in claim 1, wherein the alarm apparatus comprises:
   a setting module operable to set a plurality of threat levels and set a predetermined threat level for each swimmer installed with one of the at least one water sensing device, wherein each of the plurality of threat levels corresponds a time limit;
   a receiving module operable to receive the measured time transmitted from each of the at least three base stations;
   an analyzing module operable to determine one threat level for each swimmer by comparing the measured time with the time limit of each of the plurality of threat levels, and determine whether the determined threat level of each swimmer exceeds a predetermined threat level; and
   an alarm module operable to generate an alarm upon a condition that the determined threat level of one swimmer exceeds the predetermined threat level.

7. The safety device as claimed in claim 6, wherein each of the predetermined threat level corresponds to the predetermined time limit.

8. The safety device as claimed in claim 6, wherein the setting module is further operable to set a serial number for each of the at least water sensing device.

9. A method for monitoring personal water safety, the method comprising:
   triggering a water sensing device worn by a swimmer to measure elapsed time when the swimmer submerges in water and an electrical conductivity of the water sensing device is in a predetermined range, and stop timing when the electrical conductivity is out of the predetermined range;
   wirelessly transmitting the measured time to at least three base stations at a regular interval, the at least three base stations being arranged around a body of water in a triangle, and each of the at least three base stations receiving the measured time of the water sensing device in different signal intensities based on a transmitting direction of a time signal of the measured time;
   wirelessly receiving the measured time by an alarm apparatus from the at least three base stations;
   estimating a position of the water sensing device according to the signal intensities of the measured time, and positioning the water sensing device utilizing trigonometry; and
   generating an alarm by the alarm apparatus upon a condition that the measured time exceeds a predetermined time limit.

10. The method as claimed in claim 9, further comprising:
   setting a plurality of threat levels and a predetermined threat level for the swimmer wearing the water sensing device, wherein each of the plurality of threat levels corresponds to a time limit.

11. The method as claimed in claim 10, wherein the generating block comprises:
   determining one threat level for the swimmer by comparing the measured time with the time limit of each of the plurality of threat levels;
   determining whether the determined threat level of the swimmer exceeds a predetermined threat level; and
   generating an alarm upon a condition that the determined threat level of the swimmer exceeds the predetermined threat level.

12. The method as claimed in claim 11, wherein the predetermined threat level corresponds to the predetermined time limit.

13. The method as claimed in claim 9, further comprising:
   setting a serial number for the water sensing device.

* * * * *